United States Patent Office 3,450,643
Patented June 17, 1969

3,450,643
ALKALINE EARTH YTTRATE LUMINESCENT MATERIALS
Mary V. Hoffman, South Euclid, Ohio, assignor to General Electric Company, a corporation of New York
No Drawing. Continuation-in-part of application Ser. No. 468,810, July 1, 1965. This application Jan. 5, 1967, Ser. No. 607,368
Int. Cl. C09k 1/04
U.S. Cl. 252—301.6
10 Claims

ABSTRACT OF THE DISCLOSURE

Binary barium yttrates and ternary barium-magnesium, barium-calcium, and barium-zinc yttrates, each activated with the rare earths dysprosium, samarium, terbium, or preferably europium form phosphors with emissions characteristic of the rare earth used, and are useful in lamps and color television.

Cross-references to related applications

This application is a continuation-in-part of copending application Ser. No. 468,810, Mary V. Hoffman, filed July 1, 1965, now abandoned.

Background of the invention

The present invention relates to luminescent materials. More particularly, it relates to alkaline earth yttrate phosphors useful in discharge lamps and cathode-ray tubes.

Improvements and particular characteristics have long been sought in red emitting phosphors, both for use in improving the whiteness and color rendition of the light output of high pressure mercury vapor lamps and for use in cathode-ray tubes such as for color television.

Phosphors of manganese-activated magnesium fluorogermanate, of tin-activated strontium magnesium orthophosphate and of europium-activated yttrium orthovanadate have been used for adding a red component to the light output of high pressure mercury vapor lamps, thus improving the color of the light emitted and giving better color rendition.

Summary of the invention

It is an object of the present invention to provide new and improved red-emitting phosphors suitable for use in the color correction of high pressure mercury vapor discharge lamps and for use in cathode-ray-tube applications.

Further objects and advantages of the invention will appear from the following detailed description of species thereof.

Briefly stated, according to one aspect of the present invention, I have discovered new and improved luminescent materials of barium yttrates, which are binary compounds, and of barium-magnesium yttrates, barium-calcium yttrate, and barium-zinc yttrate, which are ternary compounds, each activated with certain rare earths and, more specifically, luminescent materials having the following molar composition:

$$a\text{BaO}:b\text{AO}:(c-d)\text{Y}_2\text{O}_3:d\text{R}_2\text{O}_3$$

wherein:

A is selected from the group consisting of Mg, Ca and Zn,
R is selected from the group consisting of Eu, Dy, Sm and Tb,
$a$ is either between about 0.8 and 1.2 or between about 1.6 and 2.4,
when $a$ is between about 0.8 and 1.2, $b$ is zero, and when $a$ is between about 1.6 and 2.4, $b$ is between about 0.8 and 1.3,
$c$ is between about 0.8 and 1.3, and
$d$ is between about 0.008 and 0.2.

More specific embodiments of the invention include the binary phosphor wherein $b$ is zero and the ternary phosphors wherein $a$ is between about 1.6 and 2.4 and $b$ is between about 0.8 and 1.3. Preferred embodiments include these specific binary and ternary phosphors in which $c$ is between about 1.00 and 1.25 and $d$ is between about 0.008 and 0.14 with R being Eu. Further preferred embodiments provide for R being Eu, $c$ being about 1.00, and $d$ being about 0.05.

Preferred activators with the various phosphors are as follows:

when A is Zn, R is Eu, Dy, Sm or Tb;
when A is Ca, R is Eu; and
when A is Mg, R is Eu or Sm.

Dy, Sm and Tb activators give better response to cathode-ray excitation than to ultraviolet radiation excitation.

Description of the preferred embodiments

Composition.—In the system $\text{BaO}:\text{Y}_2\text{O}_3$ with varying proportions of BaO and $\text{Y}_2\text{O}_3$, the only compound found to exist is $\text{BaY}_2\text{O}_4$.

In the system $\text{BaO}:\text{AO}:\text{Y}_2\text{O}_3$ (A=Zn, Ca or Mg), the ratio $\text{Ba}_2\text{AY}_2\text{O}_6$ gives ternary compounds.

$\text{Ba}_2\text{ZnY}_2\text{O}_6$ and $\text{Ba}_2\text{CaY}_2\text{O}_6$ have been isolated and found to be stable under normal atmospheric conditions. In the $\text{BaO}:\text{ZnO}:\text{Y}_2\text{O}_3$ system, another ternary compound exists, but it is not stable and therefore does not make a practical phosphor.

Binary phosphors with a ratio of $\text{Y}_2\text{O}_3/\text{BaO}$ higher than 1.0 will contain $(\text{YR})_2\text{O}_3$ as a second phase, which is also an efficient phosphor under 2537 A. excitation. Samples with a ratio less than 1.0 will contain BaO as a second phase. This material would not contribute to fluorescence and is deleterious because it is hydroscopic. If present in the phosphor, it will possibly cause problems in suspension preparation or in lamp stability. The compound $\text{BaY}_2\text{O}_4$ is found exclusive of other phases only at a ratio of 1.0, but in order to avoid the possible presence of deleteriously hydroscopic BaO, a ratio of $$1.05(\text{YR})_2\text{O}_3:1\text{BaO}$$

is the preferred binary composition. Likewise for the ternary phosphors, slight excesses of $(\text{YR})_2\text{O}_3$ are desirable for the same reasons. This can be specified as $a+b \leq 3$ and $c \geq 1$.

The variation of brightness with $\text{Eu}_2\text{O}_3$ content has been determined for binary $\text{BaY}_2\text{O}_4$:Eu and is shown in the following table for the formula

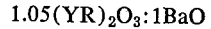

$\text{BaO}:(c-d)\text{Y}_2\text{O}_3:d\text{R}_2\text{O}_3$

| Value of $d$: | Brightness (percent) |
|---|---|
| .0025 | 25 |
| .0050 | 40 |
| .010 | 54 |
| .020 | 69 |
| .04 | 95 |
| .05 | 100 |
| .075 | 100 |
| .10 | 100 |
| .15 | 88 |
| .20 | 61 |
| .30 | 16 |

From these data, 5 mole percent $\text{Eu}_2\text{O}_3$ is chosen as the preferred composition.

Composition variations have been tried to determine if substitutions can be made in the phosphors of the invention. It was determined that small additions (1%) of Er, Gd, Sb and Bi, are definitely harmful to the phosphor brightness. Significant amounts of impurities are likely to be harmful.

Manufacturing procedure.—The preferred starting materials for these phosphors are $BaCO_3$, $BaF_2$, $ZnO$, $CaCO_3$, $MgO$ or compounds which give these materials on firing and $Y_2O_3$ which contains the desired amount of $Eu_2O_3$, or whatever rare-earth activator is used. This is obtained by dissolving $Y_2O_3$ and the desired rare-earth activator in dilute nitric acid, coprecipitating these as the oxalate by addition of oxalic acid, and then firing to form $(YR)_2O_3$. This can then be mixed with the other components by conventional means, such as ball milling, with assurance that the activator is thoroughly distributed in the composition. If the two oxides $Y_2O_3$ and $R_2O_3$ are used separately, it is difficult to obtain uniform material.

Phosphors have been fired at temperatures between 1000° C. and 1350° C. for from 2 to 16 hours. The preferred firing schedule is 1150° C. for 2.5 hours for the binary compounds and 16 hours for the ternary compounds.

As with many phosphor reactions, the formation of $BaY_2O_4$ is improved by the use of a fluxing agent. Fluorides and chlorides are commonly used and in this case, it was found that the use of 5 mole percent was sufficient to give good brightnesses in reasonable firing times. Amounts at least as high as 10 mole percent of both fluorides and chlorides were used with no further advantage. In the ternary compounds, the fluorides are preferably not used, but longer firing temperatures are required.

These studies have led to the following standard phosphor batch formulation in mole ratio which gives a good brightness with reasonable firing conditions such as 1150° C. for 2½ hours.

0.95 BaO
0.05 $BaF_2$
1.05 $(Y_{0.95}Eu_{0.5})_2O_3$

For 1000-gram batches to make $BaY_2O_4$:Eu this corresponds to:

370.7 gm. BaO
21.9 gm. $BaF_2$
563.0 gm. $(Y)_2O_3$ [1]
43.9 gm. $Eu_2O_3$ [1]

[1] Preferably combined by coprecipitation as $(YEu)_2O_3$.

Other activators would be used in proportional molar quantities and in the same manner.

The following batch formulation is satisfactory for giving $Ba_2Zn(YR)_2O_6$ phosphors of the invention when fired at 1060° C. for 16 hours.

11.25 gm. $(YR)_2O_3$
4.0 gm. ZnO
19.5 gm. $BaCO_3$

For each of these examples, $(YR)_2O_3$ contains the desired activator, preferably co-precipitated as the oxalate and fired to the oxide form. Eu, Tb, Sm and Dy can be added this way.

The $Ba_2Mg(YR)_2O_6$ and $Ba_2Ca(YR)_2O_6$ phosphors would be made similarly from the folowing batch formulations, respectively:

11.25 gm. $(YR)_2O_3$
2.0 gm. MgO
19.5 gm. $BaCO_3$ and 11.25 gm. $(YR)_2O_3$
5.0 gm. $CaCO_3$
19.5 gm. $BaCO_3$ Optical data.—In a high pressure mercury vapor lamp test, $BaY_2O:0.05\ Eu_2O_3$ gave 53.5 lumens per watt, comparable to results with $(SrMg)_3(PO_4)_2$:Sn phosphors in lumen output, and white and color rendition. Moreover, phosphors of the invention produce line emission, a desirable characteristic for certain applications. Under cathode-ray excitation, $BaY_2O_4$:Eu gave 9.1 foot-lamberts, when excited at 20 kilovolts with 17.5 microamperes per 35 square centimeters. The color was $x=0.631$, $y=0.362$ in the ICI color coordinant system.

$Ba_2MgY_2O_6:0.03Eu_2O_3$ gives a plaque brightness of about 55% of a standard Eu-activated $YVO_4$ phosphor, and $Ba_2CaY_2O_6:0.03Eu_2O_3$ gives about 45% in comparison, and $Ba_2ZnY_2O_6:0.03Eu$ gives about 24%.

Activation with Eu gives response to 2537 A. radiation and cathode-ray excitation. Tb, Sm and Dy activators only give response to cathode-ray excitation.

Colors produced with these compositions are the characteristic line emission colors found for the rare earths used and can be generally described as follows:

$Ba_2ZnY_2O_6$:Eu _____ Red.
$Ba_2ZnY_2O_6$:Tb _____ Green.
$Ba_2ZnY_2O_6$:Dy _____ Yellow.
$Ba_2ZnY_2O_6$:Sm _____ Salmon red.
$Ba_2CaY_2O_6$:Eu _____ Red.
$Ba_2MgY_2O_6$:Eu _____ Red.
$Ba_2MgY_2O_6$:Sm _____ Salmon red.

What I claim as new and desire to secure by Letters Patent of the United States is:

1. Luminescent material having the molar composition:

$$a\text{BaO}:b\text{AO}:(c-d)Y_2O_3:dR_2O_3$$

wherein:
A is selected from the groups consisting of Mg, Ca and Zn,
R is selected from the group consisting of Eu, Dy, Sm and Tb,
$a$ is either between about 0.8 and 1.2 or between about 1.6 and 2.4,
when $a$ is between about 0.8 and 1.2, $b$ is zero, and when $a$ is between about 1.6 and 2.4, $b$ is between about 0.8 and 1.3,
$c$ is between about 0.8 and 1.3, and
$d$ is between about 0.008 and 0.2.

2. Luminescent material according to claim 1 having the molar composition:

$$a\text{BaO}:(c-d)Y_2O_3:d\text{Eu}_2O_3$$

wherein:
$a$ is between about 0.8 and 1.2,
$c$ is between about 1.00 and 1.25, and
$d$ is between about 0.03 and 0.14.

3. Luminescent material according to claim 2 having the molar composition:

$$\text{BaO}:0.95Y_2O_3:0.05\text{Eu}_2O_3$$

4. Luminescent material according to claim 1 having the molar composition:

$$a\text{BaO}:b\text{AO}:(c-d)Y_2O_3:dR_2O_3$$

wherein:
A is selected from the group consisting of Mg, Ca and Zn,
R is selected from the group consisting of Eu, Dy, Sm and Tb,
$a$ is between about 1.6 and 2.4,
$b$ is between about 0.8 and 1.3,
$c$ is between about 0.8 and 1.3, and
$d$ is between about 0.008 and 0.2.

5. Luminescent material according to claim 4 having the following molar composition:

$$a\text{BaO}:b\text{CaO}:(c-d)Y_2O_3:d\text{Eu}_2O_3$$

wherein:
$a$ is between about 1.6 and 2.4,
$b$ is between about 0.8 and 1.3,
$c$ is between about 1.00 and 1.25, and
$d$ is between about 0.03 and 0.14.

6. Luminescent material according to claim 5 having the molar composition:

$$2BaO:CaO:0.95Y_2O_3:0.05Eu_2O_3$$

7. Luminescent material according to claim 4 having the molar composition:

$$aBaO:bMgO:(c-d)Y_2O_3:dEu_2O_3$$

wherein:
$a$ is between about 1.6 and 2.4,
$b$ is between about 0.8 and 1.3,
$c$ is between about 1.00 and 1.25, and
$d$ is between about 0.03 and 0.14.

8. Luminescent material according to claim 7 having the molar composition:

$$2BaO:MgO:0.95Y_2O_3:0.05Eu_2O_3$$

9. Luminescent material according to claim 4 having the molar composition:

$$aBaO:bZnO:(c-d)Y_2O_3:dEu_2O_3$$

wherein:
$a$ is between about 1.6 and 2.4,
$b$ is between about 0.8 and 1.3,
$c$ is between about 1.00 and 1.25, and
$d$ is between about 0.03 and 0.14.

10. Luminescent material according to claim 9 having the molar composition:

$$2BaO:ZnO:0.95Y_2O_3:0.05Eu_2O_3$$

References Cited

FOREIGN PATENTS 1,347,458  11/1963  France.

OTHER REFERENCES

Kroger: "Some Aspects of the Luminescence of Solids," 1948, pp. 291–292.

TOBIAS E. LEVOW, *Primary Examiner.*

R. D. EDMONDS, *Assistant Examiner.*

U.S. Cl. X.R.

252—301.4